(12) United States Patent
Zimmermann et al.

(10) Patent No.: US 9,335,457 B2
(45) Date of Patent: May 10, 2016

(54) FABRIC WITH LIGHT EMITTING LAYER

(71) Applicant: Daimler AG, Stuttgart (DE)

(72) Inventors: Tina Zimmermann, Balingen (DE); Hubert Bieder, Denkendorf (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/411,751

(22) PCT Filed: May 28, 2013

(86) PCT No.: PCT/EP2013/001573
§ 371 (c)(1),
(2) Date: Dec. 29, 2014

(87) PCT Pub. No.: WO2014/000848
PCT Pub. Date: Jan. 3, 2014

(65) Prior Publication Data
US 2015/0177436 A1    Jun. 25, 2015

(30) Foreign Application Priority Data
Jun. 30, 2012 (DE) .......................... 10 2012 013 105

(51) Int. Cl.
*F21V 8/00* (2006.01)
*D03D 1/00* (2006.01)
(Continued)

(52) U.S. Cl.
CPC ................ *G02B 6/001* (2013.01); *B60Q 3/002* (2013.01); *D03D 1/00* (2013.01); *D03D 1/0088* (2013.01); *D03D 11/00* (2013.01); *D03D 15/00* (2013.01); *F21V 13/08* (2013.01); *D10B 2201/02* (2013.01); *D10B 2211/04* (2013.01); *D10B 2321/022* (2013.01); *D10B 2331/02* (2013.01); *D10B 2331/04* (2013.01); *D10B 2401/13* (2013.01); *D10B 2401/16* (2013.01);
(Continued)

(58) Field of Classification Search
USPC ......... 362/103–108, 234, 253, 487, 488, 511, 362/551, 554, 556, 570, 582; 385/115, 120, 385/123, 128, 129, 130; 442/181, 199, 200, 442/202, 286–294; 139/383 R, 420 A, 420 R
See application file for complete search history.

(56) References Cited

U.S. PATENT DOCUMENTS 4,234,907 A * 11/1980 Daniel ................. A41D 27/085
139/420 R
5,021,928 A    6/1991 Daniel
(Continued)

FOREIGN PATENT DOCUMENTS

DE    20 2006 006 387 U1    8/2006
DE    10 2007 018 227 A1    10/2008
(Continued)

OTHER PUBLICATIONS

International Search Report (PCT/ISA/210) dated Jul. 10, 2013, with English translation (six (6) pages).
(Continued)

*Primary Examiner* — Laura Tso
(74) *Attorney, Agent, or Firm* — Crowell & Moring LLP

(57) ABSTRACT

A textile fabric has at least one fabric layer with warp and weft threads and at least one light emission layer abutting onto the first fabric layer in a flat manner and is connected to this and is formed for the conduction and the emission of light. This arrangement provides a textile fabric that provides ambient illumination.

8 Claims, 2 Drawing Sheets

Figure 4:
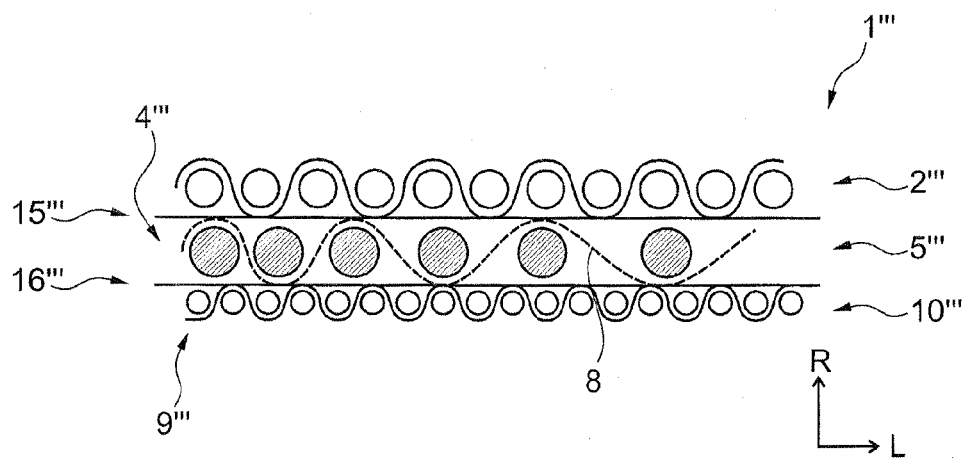

(51) Int. Cl.
- *D03D 11/00* (2006.01)
- *D03D 15/00* (2006.01)
- *B60Q 3/00* (2006.01)
- *F21V 13/08* (2006.01)

(52) U.S. Cl.
CPC ....... *D10B2401/20* (2013.01); *D10B 2403/023* (2013.01); *D10B 2505/12* (2013.01)

(56) References Cited

U.S. PATENT DOCUMENTS

| | | | |
|---|---|---|---|
| 6,490,402 B1 * | 12/2002 | Ota | D02G 3/441 257/E25.02 |
| 6,628,885 B1 * | 9/2003 | Wilkie | D02G 3/441 362/554 |
| 6,851,844 B2 | 2/2005 | Guy | |
| 7,237,933 B2 * | 7/2007 | Radu | B29C 45/14778 296/146.7 |
| 2005/0252568 A1 | 11/2005 | Huang et al. | |
| 2009/0291606 A1 | 11/2009 | Malhomme et al. | |

FOREIGN PATENT DOCUMENTS

| | | |
|---|---|---|
| EP | 1 877 605 B1 | 10/2009 |
| EP | 2 267 204 A1 | 12/2010 |
| WO | WO 02/12785 A1 | 2/2002 |
| WO | WO 2005/049905 A1 | 6/2005 |
| WO | WO 2008/043975 A1 | 4/2008 |

OTHER PUBLICATIONS

German-language Written Opinion (PCT/ISA/237) dated Jul. 10, 2013 (five (5) pages).

Partial English translation of a Chinese Office Action issued in counterpart Chinese Application No. 201380034587.1 issued on Aug. 31, 2015 (Four (4) pages).

* cited by examiner

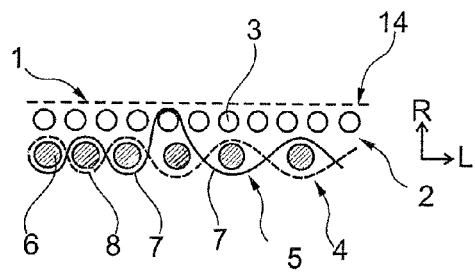
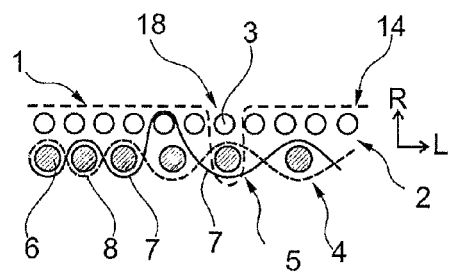
Fig. 1a　　　　　Fig. 1b
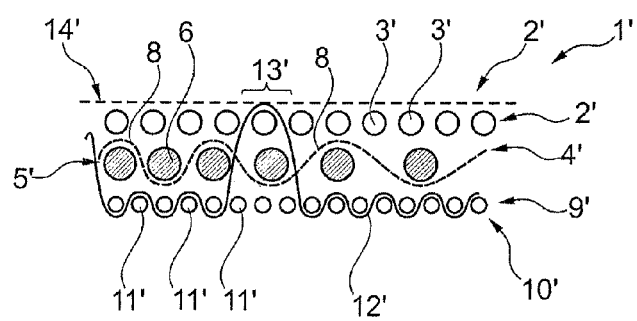
Fig. 2
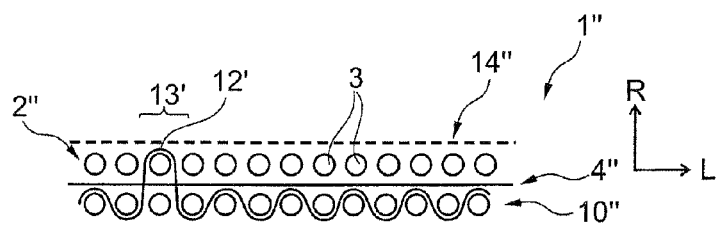
Fig. 3

FABRIC WITH LIGHT EMITTING LAYER

BACKGROUND AND SUMMARY OF THE INVENTION

Exemplary embodiments of the present invention relate to a textile fabric as well as a motor vehicle having such a textile fabric.

Textile fabrics having illuminating properties are known and can be used to illuminate a vehicle interior in a motor vehicle. For this purpose, optical fibers, which provide a partial lateral extraction of the light input into them, can be introduced into such a textile fabric. A conventional woven fabric, for example, can be used as a textile medium, since the production process thereof is particularly well suited for the incorporation of optical fibers.

Conventionally, optical fibers introduced into the woven fabric are optical fibers used in the field of data transfer for signal transfer and are modified for use as a light source in a textile fabric in such a way that they not only transport light from a first to a second end of the optical fiber, but can at least partially extract it in a transverse direction of the optical fiber. Such a lateral extraction of light from the optical fiber can be achieved by a suitable surface treatment or a suitable doping of the fiber material of the optical fibers, but also by the selection of suitable bending radii of the optical fibers.

A disadvantage of such conventional textile fabrics, however, is that these do not have the resistance required for permanent use in a motor vehicle; due to the type of connection between the optical fibers and the woven fabric, the optical fibers in such conventional woven fabrics are arranged directly on the surface of the woven fabric and are only fixed to this by a few connection points. As a consequence, the optical fibers are susceptible to external mechanical influences. Although this can be counteracted by a suitable surface treatment, this often leads to an undesired worsening of the optical properties of the optical fibers incorporated into the textile fabric. For example, such a surface treatment can lead to an inhomogeneous radiation of light as well as to undesired "sparkles" on the textile fabric, which, as a consequence, produces an uneven and thus inferior appearance of the textile fabric in a motor vehicle. Additionally, such a surface treatment is relatively cost-intensive, which is disadvantageous for the production costs for such conventional textile fabrics.

German patent document DE 10 2007 018 227 A1 describes a textile fabric, a carrier material and a plurality of bundles having optical fibers. The bundles having optical fibers are fixed to the carrier material by at least one thread. At the same time, the at least one thread holds together the fiber bundle.

European patent document EP 2 267 204 A1 describes a textile fabric having at least two warp threads that run in parallel to each other. An optical fiber is arranged between the warp threads that run in parallel to each other, the optical fiber likewise running in parallel to the warp threads and being fixed in its position relative to the warp threads.

United States patent document U.S. Pat. No. 5,021,928 describes a flat panel illumination system, having at least one light emission device and at least one optical fiber connected to the light emission device.

United States patent document U.S. 2005/0252568 A1 describes a fabric having a plurality of first light-reflecting fiber units, which are arranged substantially in parallel to one another, at a distance in a first direction, as well as a plurality of optical fiber units, which are arranged substantially in parallel to one another, at a distance to one another in a second direction. Each optical fiber unit has at least one light-emitting side section and the light-reflecting fiber units and the optical fiber units are arranged to cross one another. The luminescent fabric furthermore comprises a plurality of light-accumulating fiber units arranged along the first and second direction, wherein a part of the light-accumulating fiber units are interwoven with the first light-reflecting fiber units in the first direction, and wherein a section of the light-accumulating fiber units is interwoven with the optical fiber units.

United States patent document U.S. Pat. No. 6,851,844 B2 describes a fiber optic fabric having woven optical fibers, a light permeable coating on the fibers and openings at the highest points of the fabric. The light permeable coating prevents undesired leakage of light from the fibers, whereas the openings allow the emission of light from the fibers in a directed manner. The optical fibers allow the emission of light at a radiation angle relative to the surface of the fibers in such a way that the light is not visible from every observation point.

European patent document EP 1 877 605 B1 describes a method for the production of textile surfaces having functional threads arranged therein. These functional threads can radiate light at least in sections in a radial direction. The functional threads are inserted into the textile fiber in a weaving process without contributing to the construction of the textile, and are held by this.

Exemplary embodiments of the present invention are directed to an improved embodiment for a textile fabric, in which the disadvantages referred to above are eliminated or at least reduced.

According to exemplary embodiments of the present invention the textile fabric is formed in multiple layers, so with several fabric layers, wherein, in a first layer, optical fibers are provided for light emission, and wherein a second layer, which abuts onto this first layer, is formed as a protective layer. In this manner, the textile fabric according to the invention has very good optical properties with regard to the flat emission of light and additionally has the mechanical properties required for use in a motor vehicle, such as, for example, high abrasion resistance. The textile fabric according to the invention comprises at least one first fabric layer, which has a plurality of warp and weft threads, as well as a light emission layer, which abuts onto the first fabric layer in a flat manner and connects to this and is formed for the conduction and emission of light. Here, the first fabric layer assumes the function of a protective layer for the actual light emission layer, such that the light emission layer itself must have no particular mechanical properties with regard to its abrasion resistance, but rather can be optimized with regard to the effective and homogeneous emission of light. At least the first fabric layer can be formed as a conventional fabric having a plurality of warp and weft threads. The warp and weft threads preferably consist of a material having a particularly high abrasion resistance and at the same time is optimized with regard to the transmission of light from the light emission layer.

For example, the first fabric layer can comprise warp and weft threads made from transparent synthetic fibers, for example made from polypropylene (PP) or polyester (PES) or polyamide (PA). The synthetic fibers can therein be formed of mono- or multi-filaments.

In a preferred embodiment, the light emission layer can comprise a second fabric layer having warp and weft threads, wherein at least one of these warp or weft threads is an optical fiber, by means of which light is able to be extracted at least partially from this, transversely to a longitudinal direction of the optical fiber. The at least one optical fiber can be undulated in the second fabric layer by means of weft or warp threads that are complementary to the optical fiber. Due to the formation of the light emission layer as a second fabric layer having warp and weft threads, the at least one optical fiber can be added to the textile fabric in a mechanically stable manner, such that, in this way, a homogeneous radiation of light extracted from the optical fiber is achieved even over a large operational time period.

The optical fiber is preferably a synthetic fiber made from polymethacrylic acid ester (PMMA), polystyrene (PS) or polycarbonate (PC). Optical fibers made from such materials are particularly cost-effective to produce, such that the production costs of the textile fabric according to the invention can thus be reduced.

Alternatively, the light emission layer can comprise an electroluminescent yarn arranged to be free of undulations between the first and a third fabric layer. The electroluminescent yarn arranged to be free of undulations between the first and third fabric layer can be arranged with an additional cover and base layer between the first and third fabric layer. A particularly homogeneous emission of light from the light emission layer can be implemented by means of a light emission layer formed in this way.

In a particularly preferred embodiment, a reflective layer can be arranged on a surface of the light emission layer facing away from the first fabric layer, which reflects light emitted from the light emission layer in the direction of the first fabric layer. The reflective layer can be formed as a third fabric layer having warp and weft threads. A particularly high light output of the light emitted by the light emission layer can be achieved by a reflective layer formed in this way, such that particularly high optical efficiency can be achieved by such a textile fabric.

In a further embodiment, which is particularly simple and thus cost-effective to produce, the third fabric layer can comprise at least one synthetic fiber made from polymethacrylic acid ester (PMMA).

In order to be able to fix the light emission layer permanently to the first fabric layer or the reflective layer in a mechanically stable manner, the light emission layer can be fixed to the first fabric layer or the reflective layer by means of a first and/or a second adhesive layer. Alternatively or additionally, in order to further improve the fixing of the light emission layer to the first fabric layer or the reflective layer, the light emission layer can be fixed to the first fabric layer and/or the reflective layer by means of at least one connection warp thread and/or by means of at least one connection weft thread. Alternatively, the reflective layer can be fixed to the fabric layer by means of at least one connection warp thread and/or by means of at least one connection weft thread.

In order to further improve the material properties of the textile fabric with regard to drapability, etc. and further requirements, as can be required for a use of the textile fabric in a motor vehicle, the first fabric layer and/or the second fabric layer and/or the third fabric layer can comprise at least one elastane yarn.

Alternatively or additionally, the first fabric layer can comprise at least one transparent fabric fiber, in particular made from polypropylene (PP) or polyester (PES) or polyamide (PA), and/or at least one transparent natural fiber, in particular made from silk or cotton. Alternatively or additionally, the first and/or second and/or third fabric layer can comprise a heatable and or electrically conductive and/or fluorescent and/or antibacterial thread. Further effects that increase driving comfort and/or hygiene can hereby be achieved.

The invention furthermore relates to a motor vehicle having a vehicle interior and having a textile fabric added to the vehicle interior having one or more of the features referred to above.

Further important features and advantages of the invention result from the sub-claims, from the drawings and from the related description of the figures by means of the drawings.

It is understood that the features referred to above and still to be explained below are applicable not only in the respectively specified combination, but also in other combinations or individually, without leaving the scope of the present invention.

Preferred exemplary embodiments of the invention are depicted in the drawings and are explained in more detail in the description below, wherein the same reference numerals refer to the same or similar or functionally identical components.

BRIEF DESCRIPTION OF THE DRAWING FIGURES

Here are shown, each schematically:

FIG. 1a a first exemplary embodiment of a textile fabric according to the invention.

Figure 5:
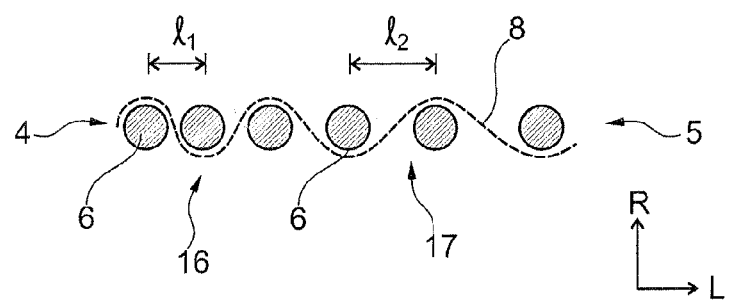

FIG. 1b a further variant of the exemplary embodiment of FIG. 1 having an integrated cover layer, FIG. 2 a second variant of the exemplary embodiment of FIG. 1, FIG. 3 a second variant of the exemplary embodiment of FIG. 1, FIG. 4 a third variant of the exemplary embodiment of FIG. 1, FIG. 5 a further variant applicable to the exemplary embodiments of FIGS. 1 to 4, according to which an undulation distance of the optical fiber is varied.

DETAILED DESCRIPTION

FIG. 1a,b depict a textile fabric 1 according to the invention. The textile fabric 1 comprises a first fabric layer 2, which has warp and weft threads, wherein only warp threads 3 are depicted in the depiction of FIG. 1a,b with regard to the first fabric layer 2 (FIG. 1a, b therefore shows a warp cut of the textile fabric 1). The textile fabric 1 furthermore comprises a light emission layer 4 abutting onto the first fabric layer 2 in a flat manner. The light emission layer 4 is connected to the first fabric layer 2 and is formed for the conduction and the emission of light. The light emission layer 4 comprises a second fabric layer 5 having warp and weft threads 6, 7. At least one of these weft threads 7 is an optical fiber 8 (depicted in FIG. 1a,b with a dashed line), by means of which light is able to be extracted at least partially from this in the direction R (therefore orthogonally to the light emission layer 8 and transversely to a longitudinal direction L of the optical fiber 8). For this purpose, the optical fiber 8 can undergo a suitable surface treatment or can be doped in a suitable manner. The optical fiber 8 is undulated in the second fabric layer 5 by means of warp threads 6 which are complementary to the optical fiber 8. A further weft thread 7 (depicted in FIG. 1a with a solid line) can be formed in the manner of a connection weft thread, which connects the light emission layer 4 to the first fabric layer 2.

It is clear that, in one variant, the optical fiber 8 can also be formed as a warp thread, such that it is then undulated in the second fabric layer 5 by means of complementary weft threads. The optical fiber 8 can preferably be a synthetic fiber made from polymethacrylic acid ester (PMMA), polystyrene (PS) or polycarbonate (PC). The first fabric layer 2 can preferably be a synthetic fiber made from polypropylene (PP), polyester (PES) or polyamide (PA), wherein the synthetic fibers can consist of monofilaments or multi-filaments. Alternatively, a transparent natural fiber, in particular made from silk or cotton, can be used.

FIG. 2 shows a variant of the textile fabric 1' according to the invention in which a reflective layer 9' is arranged on a surface of the light emission layer 4' facing away from the first fabric layer 2', which reflects light emitted by the light emission layer 4' in the direction R of the fabric layer 3'. The reflective layer 9' is therein formed as a third fabric layer 10' having warp and weft threads 11', 12'. The third fabric layer 10' can comprise synthetic fibers made from polymethacrylic acid ester (PMMA). The synthetic fibers can therein have a trilobal or star-shaped cross-sectional surface. The weft thread 12' can be formed in the manner of a connection weft thread, which, as is shown as an example in FIG. 2, can connect the first fabric layer 2' to the third fabric layer 10'. For this purpose, the weft thread 12' formed as a connection weft thread can be implemented in the region 13' by the light emission layer 4', such that, in this manner, the three fabric layers 4', 5' and 10' can be connected to one another in a mechanically stable manner.

It is clear that the region referred to in FIG. 2 with 13' is to be understood to only be an example. In fact, in variants, a plurality of such regions 13' can be provided in which the connection weft thread 12' connects the first and third fabric layer 2', 10' to each other. Alternatively or additionally, warp threads 11' can of course also be formed as connection warp threads. For the person skilled in the art, diverse implementation possibilities result, only one of which is depicted as an example in FIG. 2.

Fundamentally, the first fabric layer 2, 2' can comprise at least one synthetic fiber that is transparent for light, in particular made from polypropylene (PP) or polyester (PS) or polyamide (PA). Alternatively or additionally, the first fabric layer 2, 2' can also, however, comprise a natural fiber that is transparent for light, in particular made from silk or cotton.

Optionally, a cover layer 14, 14' can be applied to the upper side of the first fabric layer 2, 2', for example by means of printing. By means of such a cover layer, patterns which are optically particularly appealing for an observer can be implemented which ensure a high value appearance of the textile fabric 1, 1'.

A variant is shown in FIG. 1a, according to which the cover layer 14 lies on the first fabric layer 2. On the other hand, FIG. 1b shows an alternative variant to this, according to which the cover layer 14 is connected at least in sections to the first fabric layer 2 (as is depicted in FIG. 1b in the region referred to with the reference numeral 18) and forms a fabric with this in region 18. It is clear that the region 18 in FIG. 1b is selected only as an example; countless variations are able to be suggested with regard to this in variants to the exemplary embodiment of FIG. 1b. For example, the cover layer 14 can form a fabric with this not only in regions but over the entire contact surface of the cover layer 14 with the first fabric layer 2. Here, it can be considered that the warp threads 6 of the second fabric layer 5 can be integrated by the cover layer 14 (not shown). A luminescent material can preferably be selected for the cover layer 14, 14'. Both the cover layer 14, 14' and the first fabric layer 2, 2' can be provided with a suitable pattern during weaving, so during the production. For the improvement of the mechanical properties, in particular the drapability, the first, second and third fabric layer 2, 5, 2', 5', 10' can be incorporated into this elastane yarn.

FIG. 3 shows a third variant of the textile fabric 1" according to the invention in which the light emission layer 4" is arranged to be free of undulations between the first and third fabric layer 2", 10". The light emission layer 4" can comprise and electroluminescent yarn. Also in this variant, a cover layer 14" can be provided, as is explained above, on the upper side of the first fabric layer 2". The explanations for the variant of the cover layer 14 according to FIG. 1b also apply mutatis mutandis for the cover layers 14', 14" explained in connection with FIGS. 2 and 3.

FIG. 4 shows a further variant of the textile fabric 1' according to the invention, which has the first, second and third fabric layer 2''', 5''', 10''' already explained above, wherein according to this variant, the first fabric layer 2''' is fixed to the second fabric layer 5''' formed as a light emission layer 4''' by means of a first adhesive layer 15'''. Correspondingly, the second fabric layer 5''' is fixed to the second adhesive layer 16''' formed as a reflective layer 9''' by means of a second adhesive layer 16'''.

In further variants, the exemplary embodiments according to FIGS. 1 to 4 can be combined with one another.

FIG. 5 shows how, in one variant of the exemplary embodiments according to FIGS. 1 to 4, the undulation of the optical fiber 8 can be implemented at varying distances by means of the warp thread 6 that is complementary to this. In this manner, a particularly homogeneous light extraction of light from the light emission layer 4 formed as a second fabric layer 5 can be achieved. Thus, for this purpose, an undulation distance 11 of the warp threads 6 can be smaller in one region 16 than in a second region 17 arranged at a distance to this, in which the undulation distance 12 is therefore larger than the undulation distance 11 in the region 16. With regard to such a variation of the undulation distance, countless variation possibilities result for the person skilled in the art.

Alternatively to the variation of the undulation distance shown in FIG. 5, a diameter of the warp thread 6 can also be varied within the light emission layer 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A textile fabric, comprising:
a first fabric layer having warp and weft threads; and
a light emission layer abutting onto the first fabric layer in a flat manner, wherein the light emission layer is connected to the first fabric layer, and wherein the light emission layer is configured to conduct and emit light, wherein
the light emission layer comprises a second fabric layer having warp and weft threads,
at least one of the warp or weft threads of the second fabric layer is an optical fiber configured to at least partially extract light transversely to a longitudinal direction of the optical fiber,
the optical fiber is undulated in the second fabric layer by weft or warp threads that are complementary to the optical fiber.
2. The textile fabric of claim 1, wherein the optical fiber comprises a synthetic fiber made from polymethacrylic acid ester, polystyrene, or polycarbonate.
3. A textile fabric, comprising:
a first fabric layer having warp and weft threads; and
a light emission layer abutting onto the first fabric layer in a flat manner, wherein the light emission layer is connected to the first fabric layer, and wherein the light emission layer is configured to conduct and emit light, wherein the light emission layer comprises an electroluminescent yarn that is arranged to be free of undulations between the first and a third fabric layer.

4. A textile fabric, comprising:
a first fabric layer having warp and weft threads;
a light emission layer abutting onto the first fabric layer in a flat manner, wherein the light emission layer is connected to the first fabric layer, and wherein the light emission layer is configured to conduct and emit light; and
a reflective layer on a surface of the light emission layer facing away from the first fabric layer, wherein the reflective layer is configured to reflect light emitted from the light emission layer in a direction of the first fabric layer,
wherein the reflective layer is a third fabric layer having warp and weft threads.

5. The textile fabric of claim 4, wherein the third fabric layer comprises at least one synthetic fiber made from polymethacrylic acid ester.

6. The textile fabric of claim 4, wherein the light emission layer is fixed to the first fabric layer or the reflective layer by a first or second adhesive layer.

7. The textile fabric of claim 4, wherein
the light emission layer is fixed to the first fabric layer or the reflective layer by at least one connection warp thread or at least one connection weft thread, or
the reflective layer is fixed to the first fabric layer by at least one connection warp thread or at least one connection weft thread.

8. The textile fabric of claim 4, wherein
the first fabric layer, second fabric layer, or third fabric layer comprises at least one elastane yarn, or
the first fabric layer comprises at least one transparent synthetic fiber made from polypropylene or polyester or polyamide, at least one transparent natural fiber made from silk or cotton, or the first, second, or third fabric layer comprises a heatable or electrically conductive or fluorescent or antibacterial thread.

* * * * *